US010483766B2

(12) United States Patent
Gao et al.

(10) Patent No.: US 10,483,766 B2
(45) Date of Patent: Nov. 19, 2019

(54) POWER RECEIVER CIRCUIT

(71) Applicant: uBeam Inc., Santa Monica, CA (US)

(72) Inventors: Hong Gao, Marina del Rey, CA (US); Jonathan Bolus, Santa Monica, CA (US)

(73) Assignee: uBeam Inc., Marina del Rey, CA (US)

( * ) Notice: Subject to any disclaimer, the term of this patent is extended or adjusted under 35 U.S.C. 154(b) by 0 days.

(21) Appl. No.: 15/885,493

(22) Filed: Jan. 31, 2018

(65) Prior Publication Data

US 2018/0159337 A1 Jun. 7, 2018

Related U.S. Application Data

(60) Division of application No. 15/665,074, filed on Jul. 31, 2017, now Pat. No. 9,912,165, which is a (Continued)

(51) Int. Cl.
*H02J 5/00* (2016.01)
*H02J 50/15* (2016.01)
(Continued)

(52) U.S. Cl.
CPC .......... *H02J 5/00* (2013.01); *H02J 1/00* (2013.01); *H02J 1/102* (2013.01); *H02J 1/108* (2013.01);
(Continued)

(58) Field of Classification Search
CPC ............ H02J 5/005; H02J 7/025; H02J 17/00; H02N 2/008; H04B 5/0025–0093; B60L 5/005; B60L 11/182; B60L 11/1829–1831; Y02T 90/122; H01F 27/006; H01F 27/02; H01F 38/14; H01F 2038/143–146; H01R 13/6633; A61B 1/00029; A61N 1/3787
(Continued)

(56) References Cited

U.S. PATENT DOCUMENTS 5,289,046 A 2/1994 Gregorich
10,063,064 B1 * 8/2018 Bell .................. H02J 5/005
(Continued)

OTHER PUBLICATIONS

International Search Report and Written Opinion dated Sep. 25, 2018 issued in PCT/US2018/041857, 9 pages.

*Primary Examiner* — Rexford N Barnie
*Assistant Examiner* — Thai H Tran
(74) *Attorney, Agent, or Firm* — Morris & Kamlay LLP

(57) ABSTRACT

Systems and techniques are provided for a power receiver circuit. A power generating mechanism may include power generating elements that may generate alternating current signals. Rectifier circuit may include rectifiers that may generate a direct current signal from an alternating current signal, and diodes. Group circuits that may connect groups of rectifier circuits in electrical circuits to combine the direct current signals from the rectifier circuits in a group into a single direct current signal. A step down converter may be connected to the group circuits. The step down converter may convert a direct current signal to a direct current signal of a target voltage level. An output switch may be connected to the step down converter. A linear regulator may be connected to the step down converter. A microcontroller may be connected to the linear regulator and the output switch and may control the output switch.

11 Claims, 13 Drawing Sheets

Related U.S. Application Data continuation-in-part of application No. 15/132,074, filed on Apr. 18, 2016, now Pat. No. 9,954,373.

(51) Int. Cl.
  *H02M 7/217* (2006.01)
  *H02J 1/00* (2006.01)
  *H02J 1/10* (2006.01)
  *H02J 1/12* (2006.01)
  *H02J 7/34* (2006.01)
  *H02M 1/32* (2007.01)
  *H02M 1/00* (2006.01)

(52) U.S. Cl.
  CPC ............... *H02J 1/12* (2013.01); *H02J 7/345* (2013.01); *H02J 50/15* (2016.02); *H02M 7/2176* (2013.01); *H02J 2001/002* (2013.01); *H02J 2001/008* (2013.01); *H02M 1/32* (2013.01); *H02M 2001/008* (2013.01); *H02M 2001/0045* (2013.01)

(58) Field of Classification Search
  USPC .......................................... 307/104; 320/108
  See application file for complete search history.

(56) References Cited

U.S. PATENT DOCUMENTS

| | | | |
|---|---|---|---|
| 10,103,552 B1* | 10/2018 | Leabman | H02J 5/005 |
| 2009/0200985 A1 | 8/2009 | Zane | |
| 2010/0026100 A1 | 2/2010 | Teggatz | |
| 2010/0264731 A1* | 10/2010 | Arimilli | H02J 1/102 307/24 |
| 2012/0049833 A1 | 3/2012 | Chang | |
| 2013/0241468 A1 | 9/2013 | Moshfeghi | |
| 2013/0241474 A1 | 9/2013 | Moshfeghi | |
| 2016/0099601 A1 | 4/2016 | Leabman | |
| 2016/0099602 A1* | 4/2016 | Leabman | H02J 7/025 307/104 |

* cited by examiner

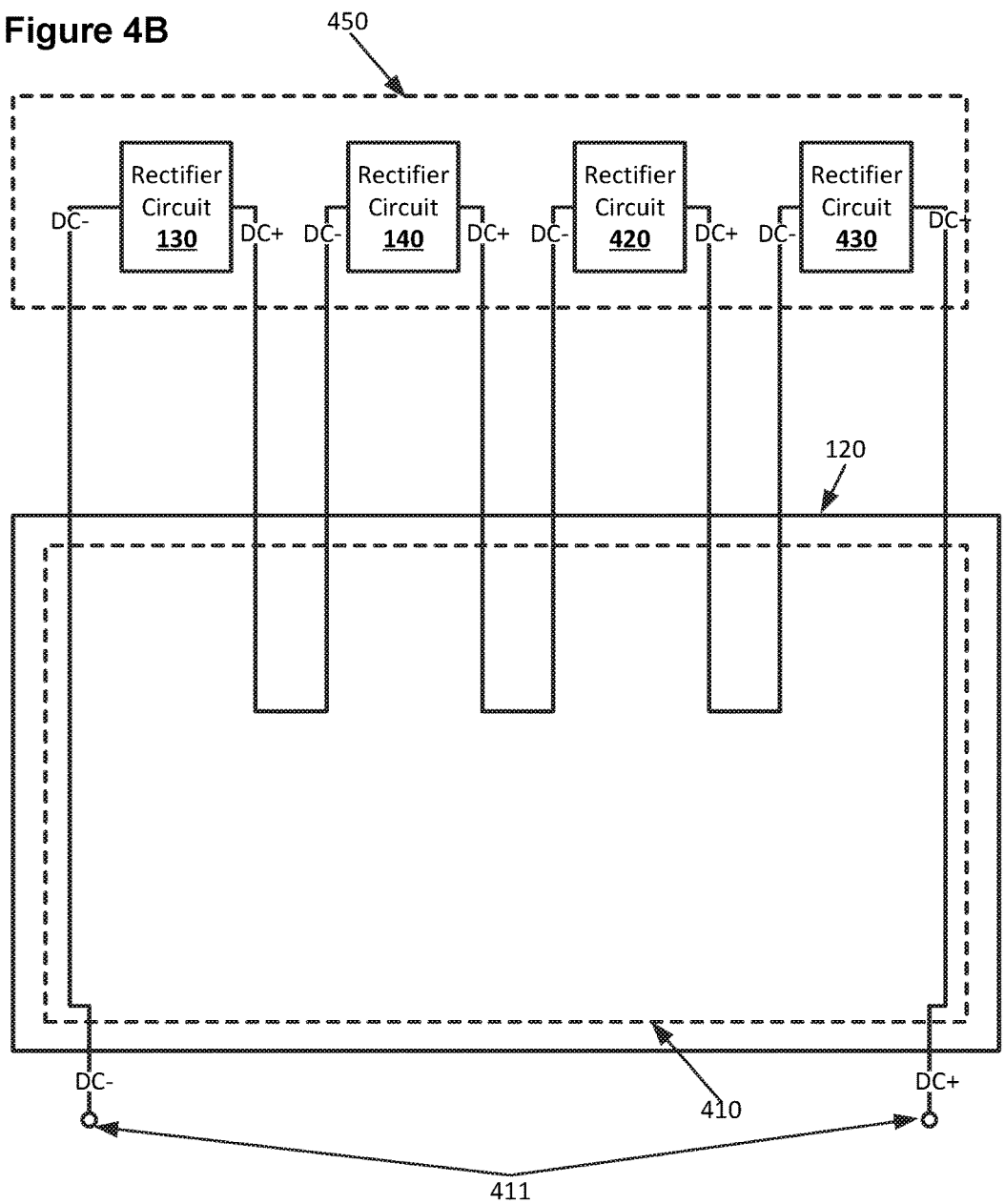

POWER RECEIVER CIRCUIT

BACKGROUND

Power generating mechanisms may deliver alternating current to a device that may run on direct current. The device may operate, or charge a battery, using the alternating current by converting it to direct current. The alternating current delivered by some power generating mechanisms may have varying amplitudes, which may result in inefficient conversion of the alternating current to direct current.

BRIEF SUMMARY

According to implementations of the disclosed subject matter, a power generating mechanism may include power generating elements that may generate alternating current signals. Rectifier circuits may include rectifiers that may generate a direct current signal from an alternating current signal, and diodes. Group circuits may connect a group of rectifier circuits in an electrical circuit to combine the direct current signals from the rectifier circuits in the group into a single direct current signal. Switch circuits may include switch channels. Each switch channel may connect to one of the group circuits and may include a switch bank including outputs and a maximum power point tracker (MPPT). A voltage bus may include capacitors. Each capacitor may be connected to the switch circuits. Undervoltage lockouts may have an input connected to one of the capacitors and an output, each of the two or more undervoltage lockouts configured to disconnect its output when a voltage level input to the undervoltage lockout drops below a predetermined threshold, and wherein the predetermined threshold is different for at least two of the or more undervoltage lockouts. DC/DC converters may be connected to the undervoltage lockouts. The DC/DC converters may convert a direct current signal of a predetermined voltage level to a direct current signal of a target voltage level. The predetermined voltage level may be different for at least two of DC/DC converters.

A power generating mechanism may include power generating elements that may generate alternating current signals. Rectifier circuit may include rectifiers that may generate a direct current signal from an alternating current signal, and diodes. Group circuits that may connect groups of rectifier circuits in electrical circuits to combine the direct current signals from the rectifier circuits in a group into a single direct current signal. A step down converter may be connected to the group circuits. The step down converter may convert a direct current signal to a direct current signal of a target voltage level. An output switch may be connected to the step down converter. A linear regulator may be connected to the step down converter. A microcontroller may be connected to the linear regulator and the output switch and may control the output switch.

Systems and techniques disclosed herein may allow for a power receiver circuit. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4B shows an example system suitable for a power receiver circuit according to an implementation of the disclosed subject matter.

DETAILED DESCRIPTION

Figure 1:
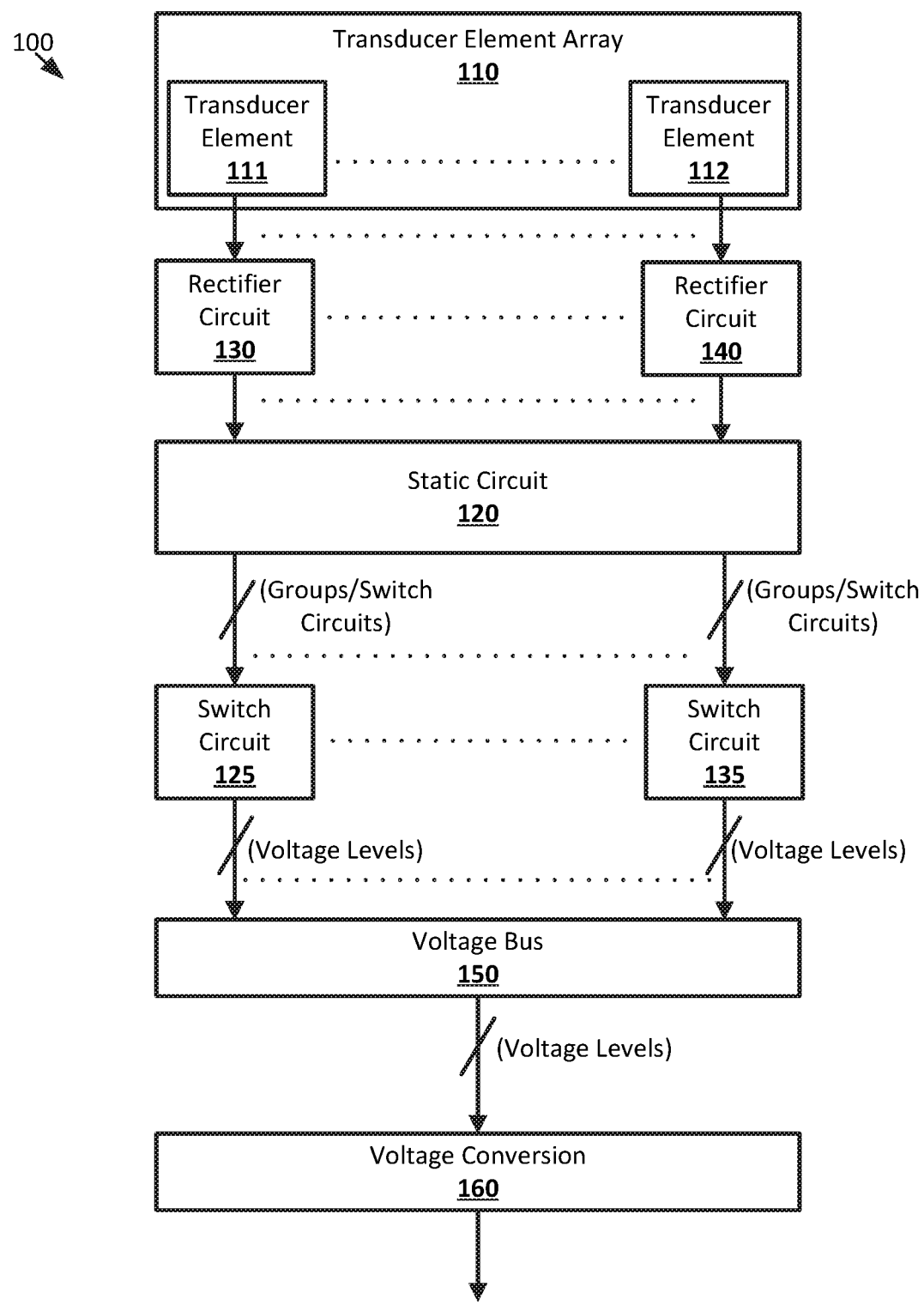
FIG. 1 shows an example system suitable for a power receiver circuit according to an implementation of the disclosed subject matter.

According to embodiments disclosed herein, alternating current signals of varying amplitudes may be efficiently converted to a direct current signal with a specified voltage. The alternating current signals may be converted to direct current signals of different voltages depending on the magnitude of each alternating current signal. The direct current signals of different voltages may then be converted to direct current signals of the same, specified, voltage, which may be combined into an output direct current signal of the specified voltage.

A power receiver circuit may be connected to a power generating mechanism. The power generating mechanism may be, for example, an array of power generating elements.

For example, the power generating mechanism may be a transducer array, such as an optical transducer array or an ultrasonic transducer array including any suitable number of ultrasonic transducer elements, or a radio frequency (RF) receiver. The power generating elements may be transducer elements. Each power generating element may generate an alternating current signal of varying amplitude, and amplitudes and phases of the alternating current signals generated by different power generating elements may vary, resulting in alternating current signals of varying voltages. For example, ultrasonic transducer elements of an ultrasonic transducer array may generate alternating current signals based on the movement of a flexure, such as a piezoelectric flexure, in response to received ultrasound waves. The amplitude of the alternating current signals generated by an ultrasonic transducer element may vary as the amplitude of the ultrasonic waves received by the ultrasonic transducer element change. Different ultrasonic transducer elements in the same ultrasonic transducer array may generate alternating current signals with different amplitudes, resulting in the alternating current signals having different voltages. The alternating current signals may have various phase shifts relative to each other.

The power receiver circuit may include any suitable number of rectifier circuits. For example, there may be one rectifier circuit for each power generating element in the power generating mechanism. Each rectifier circuit may include a rectifier and a diode. The rectifier may be an AC/DC rectifier of any suitable type. The rectifier be a full-wave bridge rectifier with differential inputs. The rectifier may use a diode bridge, Schottky diodes, diode-connected FETS, or may be any form of synchronous rectifier. The rectifier of a rectifier circuit may receive the alternating current signal from a single power generating element and may output a direct current signal of any suitable voltage using positive and negative direct current output leads. The diode may be connected to one of the direct current output leads of the rectifier. For example, the diode may be connected to the positive direct current output lead. A rectifier circuit may also include a switch which may allow the direct current output from the rectifier to be dumped to ground, for example, in order to disconnect the output of the rectifier circuit.

The power receiver circuit may include a static circuit. The rectifier circuits may be connected to the static circuit. The static circuit may include any suitable number of group circuits, each connecting any suitable number of the rectifier circuits in parallel or in series. For example, an ultrasonic transducer array may include 256 ultrasonic transducer elements and 256 rectifier circuits. The static circuit may include 64 group circuits, each of which connects a group of 4 rectifier circuits in parallel electrically. Each group circuit may include its own output, which may output a direct current signal that results from combining the direct current signals of the rectifier circuits connected to the group circuit. For example, a static circuit with 64 group circuits may include 64 outputs. The diodes of the rectifier circuits may allow for the direct current outputs of the rectifier circuits to be combined by the static circuit without the voltage output by a group circuit dropping to the lowest voltage output by any of the rectifier circuits connected to the group circuit. The rectifier circuits in a group connected to the same group circuit may be selected in any suitable manner. The static circuit and group circuits may be implemented in any suitable manner. For example, the static circuit may be implemented through routing circuitry on layers of a PCB which includes the power generating elements and rectifier circuits.

The power receiver circuit may include any suitable number of switch circuits. Each switch circuit may include any suitable number of channels, which may be connected to the outputs of the group circuits. The number of channels in a switch circuit may be equal to number of group circuits connected to the switch circuit. For example, a switch circuit connected to 32 group circuits may include 32 channels, with each channel connected to the outputs of one of the group circuits.

A switch channel may include a maximum power point tracker (MPPT), and a switch bank. The switch bank may include any suitable number of outputs, which may carry a direct current signal received from the rectifier circuit. Each of the outputs of the switch bank may be assigned a different voltage level, and the switch bank may select only one output at a time to receive the direct current signal from the rectifier circuit. The direct current signal from the rectifier circuit may be output from the switch channel through the selected output of the switch channel's switch bank. For example, a switch bank may include five outputs, which may be assigned voltage levels of 6 Volts, 10 Volts, 14 Volts, 18 Volts, and 22 Volts. The voltage of the direct current signal output by the rectifier circuit may be, or be within a range of, the voltage of the selected switch bank output. The outputs of the switch banks of the switch channels of a switch circuit may be combined, so that the switch circuit may have a number of outputs equal to the number of outputs of a single switch bank. Each output from a switch circuit may be connected to outputs from the switch banks of the switch channels that were assigned the same voltage level. For example, a switch circuit with 32 switch channels with switch banks with five outputs may have five outputs. Each output may be a combination of the direct current signals from the 32 switch channels for one of the 5 switch bank output voltage levels. For example, if the voltage levels assigned to the switch bank outputs are 6 Volts, 10 Volts, 14 Volts, 18 Volts, and 22 Volts, the switch circuit may have 6 Volt output that is connected to the 32 6 Volt outputs of the 32 switch banks of the 32 switch channels, a 10 Volt output that is connected to the 32 10 Volt outputs of the 32 switch banks of the 32 switch channels, a 14 Volt output that is connected to the 32 14 Volt outputs of the 32 switch banks of the 32 switch channels, a 18 Volt output that is connected to the 32 18 Volt outputs of the 32 switch banks of the 32 switch channels, and a 22 Volt output that is connected to the 32 22 Volt outputs of the 32 switch banks of the 32 switch channels.

The MPPT may select which of the switch bank's outputs should be used to output the direct current signal generated by the rectifier circuit from the switch channel. The selected output may be based on the voltage level that will maximize the power transferred out of the switch channel. The MPPT may select a switch bank output in any suitable manner. For example, the MPPT may measure the voltage of the direct current signal input into the switch bank, and may select a switch bank output based on the measured voltage. The MPPT may, instead of directly monitoring the voltage input to the switch bank from the rectifier circuit, iteratively select each of the available outputs of the switch bank, measure the power transfer achieved through each output, and then select the output that exhibits the maximum power transfer. The MPPT may select an output of the switch bank at any suitable interval and at any suitable rate, and may leave an output selected for any suitable length of time before selecting a different output.

The switch circuit and switch channels may be implemented in any suitable manner. For example, each switch circuit may be implemented as an ASIC. Each switch channel may be implemented in the ASIC for a switch circuit. The switch circuit ASICs may be installed on the same PCB that includes the rectifier circuits, static circuit and the power generation elements, for example, on a PCB layer on the opposite side of the PCB from the power generation elements.

The power receiver circuit may include a voltage bus. The voltage bus may include any suitable number of direct current inputs, of any suitable voltage levels, connected to any suitable number of capacitors or other forms of power storage. The number of direct current inputs to the voltage bus may be the same as the number of the direct current outputs of a switch bank multiplied by the number of switch circuits. For example, the voltage bus may be connected to 4 switch circuits. The switch circuits may each have 32 channels, with switch banks with five outputs. The voltage bus may include 20 direct current inputs to match the 20 total direct current outputs of the 4 switch circuits. The outputs from each switch circuit may be connected to one of the capacitors of the voltage bus in parallel or in series. For example, each of 4 switch circuits may have 6 Volt outputs. The 6 Volt outputs from the 4 switch circuits may be connected to a capacitor on the voltage bus. Each of the capacitors of the voltage bus may have its own direct current output from the voltage bus. The voltage of the direct current signal carried on the output of a capacitor may match the voltages of the direct current signals input into the capacitor from the switch circuits. For example, a capacitor into which 6 Volt direct current signals are input may output a 6 Volt direct current signal. The number of outputs from the voltage bus may be equal to the number of capacitors, which may in turn be equal to the number of outputs from a switch bank of a switch channel. The voltage bus may be implemented in any suitable manner. For example, the voltage bus may be implemented on any suitable of layer of the PCB. The voltages of the direct current signal both input to and output from the capacitors may vary within a range of the voltages of the outputs from the rectifier circuits and switch circuits. For example, voltages of direct current signals carried on a 6 Volt output from the switch circuit may vary over any suitable range around 6 Volts, and the voltage of the direct current signal output of the capacitor connected to the 6 Volt output may vary in a range around 6 Volts. The range over which the voltage of the direct current signal output from the capacitor varies may be smaller than the range over which the voltage of the direct current signal input to the capacitor varies.

The power receiver circuit may include any suitable number of voltage converters. For example, the power receiver circuit may include a number of DC/DC voltage converters equal to the number of outputs from the capacitors of the voltage bus. Each DC/DC voltage converter may be connected to the output of one of the capacitors of the voltage bus, and may convert the direct current signal with that capacitor's output voltage to some specified, target, voltage. The target voltage may be the same for all of the DC/DC voltage converters in the power receiver circuit. For example, a first DC/DC voltage converter may be connected to a capacitor that outputs a 6 Volt direct current signal, and may convert that to a 5 Volt direct current signal. A second DC/DC voltage converter may be connected to a capacitor that outputs a 10 Volt direct current signal, and may convert that to a 5 Volt direct current signal. The direct current signals output by the DC/DC voltage converters may be combined, resulting in a single direct current signal of the target voltage level that may be output from the power receiver circuit and used in any suitable manner, such as, for example, to power and suitable electric or electronic device or circuit, such as a charging circuit for a battery. The DC/DC voltage converters may be implemented in any suitable manner. For example, the DC/DC voltage converters may be switching converters, and may be discrete converters, or may be integrated.

Each DC/DC voltage converter may have an undervoltage lockout. An undervoltage lockout may be connected in between the output of each capacitor of the voltage bus and each DC/DC voltage converter, and may be any suitable device or mechanism for detecting voltage levels of the output from the capacitors and cutting off the direct current signal input into the DC/DC voltage converters when the voltage drops too low, for example, below a threshold level, and reconnecting the direct current signal when the voltage is at or above the threshold level. For example, a capacitor may output a 10 Volt direct current signal. If the voltage lockout detects that the output from the capacitor has dropped too far below 10 Volts, for example, due to the capacitor being undercharged, the voltage lockout may disconnect the capacitor from the DC/DC voltage converter that converts the direct current signal from 10 Volts to 5 Volts. The undervoltage lockout may reconnect that capacitor to the DC/DC voltage converter when the voltage output from the capacitor has reached a suitable level, for example, within any suitable range of or above 10 Volts. An undervoltage lockout may be set to disconnect and reconnect a DC/DC voltage converter from a capacitor based on any suitable voltage threshold, and undervoltage lockouts connected to different voltage levels may have different thresholds.

In some implementations, the outputs from the static circuit may be connected to a step down converter. The step down converter may receive as input a direct current signal that is the combined output of all of the group circuits of the static circuit, and may convert the voltage of this direct current signal to a specified, target voltage, such as, for example, 5 Volts. The step down converter may use any suitable components for stepping down DC voltages, and may be able to accept direct current signals over a wide range of voltages and convert these direct current signals to a direct current signal of the target voltage. The output of the step down converter may go to both a linear regulator and an output switch. The output of the output switch may be the output for the power receiver circuit, and may be, for example, connected to a charging circuit for a battery. When the output switch is closed, power may be delivered from the power receiver circuit to a circuit, such as the charging circuit, connected to the output. The opening and closing of the output switch may be controlled by a microcontroller.

The linear regulator may convert the direct current signal of the target voltage output by the step down converter to a direct current signal having a native voltage level for the microcontroller. The output of the linear regulator may be connected to the microcontroller, powering the microcontroller. The microcontroller may be any suitable electronic microcontroller, and may include an integrated analog-to-digital converter and radio. The microcontroller may monitor the operation of the power receiver circuit. For example, the microcontroller may monitor the voltage ($V_{RECT}$) of the direct current signal being output from the static circuit into the step down converter, the voltage ($V_{LOAD}$) of the direct signal being output from the step down converter to the linear regulator and output switch, and the amperage ($I_{LOAD}$) of the direct current signal being output from the output switch. The microcontroller may use the radio to communicate with a transmitting device that transmits wireless power to the power generating mechanism, for example to report $V_{RECT}$, $V_{LOAD}$, and $I_{OUT}$, so that the transmitting device may adjust the delivery of wireless power to the power generating mechanism. The microcontroller may control the opening and closing of the output switch, for example, through an enable/disable line connecting the microcontroller to the output switch.

The microcontroller may implement a state machine. The state machine may include four states, a dead state, a handshake state, a standby state, a charge state. In the dead state, there may not be enough power to operate the microcontroller. For example, the power generating mechanism may not generate enough power to generate a direct current signal of sufficient voltage through the step down converter and linear regulator to operate the microcontroller, and a secondary source of power, such as a battery connected to a charging circuit connected to the power receiver circuit, may also not have enough power to operate the microcontroller. In the dead state, if the power generating mechanism begins to receive sufficient power from the transmitting device, the power generating mechanism may begin to generate power in the form of an alternating current signal. When the power generating mechanism generates sufficient power to raise the voltage of the direct current signal supplied to the microcontroller from the linear regulator to operating levels, the microcontroller may generate a power-on-reset signal and enter the handshake state.

In the handshake state, the microcontroller may use the radio to communicate with the transmitting device. The radio may communicate any suitable data to the transmitting device, including, for example, data regarding characteristics of the power generating mechanism that may be used by the transmitting device to adjust various aspects of power delivered to the power generating mechanism. For example, the radio may communicate data that indicates the presence of the power generating mechanism, the location of the power generating mechanism, and may authenticate the power receiver circuit to the transmitting device, which may only transmit power to the power generating mechanisms of authenticated power receiver circuits.

Once communication has been established with the transmitting device, the microcontroller may enter the standby state. The microcontroller may enter the standby state after receiving an instruction (TX_STBY) from the transmitting device.

In the standby state, the microcontroller may use the radio to communicate with the transmitting device. The communication may be periodic, and may include any suitable data, such as, for example $V_{RECT}$ and $V_{LOAD}$ values as determined by the microcontroller. The transmitting device may use the data received from the microcontroller to adjust the delivery of power to the power generating mechanism in any suitable manner. For example, the transmitting device may adjust the phase, amplitude, focus, and steering of an ultrasonic beam directed at an ultrasonic transducer array. The transmitting device may determine the minimum amount of power that can be delivered to the power generating mechanism to allow the power receiver circuit to output a useful amount of power. For example, the transmitting device may determine the minimum amount of power needed to allow the power receiver circuit to charge a device battery through a charging circuit that receives power output by the power receiver circuit. The transmitting device may, for example, compare received $V_{RECT}$ values to a predetermined threshold for rectifier voltage ($V_{RECT\_TH}$), and determine the minimum power that can be delivered to the power generating mechanism to maintain $V_{RECT} > V_{RECT\_TH}$ at the input of the step down converter from the static circuit of the power receiving circuit. When the transmitting device has determined the minimum power that it needs to deliver, the transmitting device may instruct the microcontroller to enter the charge state, for example, sending an appropriate command (TX_CHARGE), to the microcontroller through the radio.

In the charge state, the microcontroller may cause the output switch to close, allowing the power receiver circuit to deliver power to a suitable circuit, such as a charging circuit for a battery, connected to the output of the output switch. The power delivered by the closed output switch may be a direct current signal having the same voltage level $V_{LOAD}$ as the direct current signal output from the step down converter, which may be, for example, 5 Volts, and may have amperage $I_{LOAD}$. The microcontroller may continue to communicate with the transmitting device through the radio while in the charge state. For example, the microcontroller may send $V_{RECT}$, $V_{LOAD}$, and $I_{LOAD}$ values to the transmitting device, which may make adjustments to the power delivered to the power generating mechanism to maintain $V_{RECT}$, $V_{LOAD}$, and $I_{LOAD}$ at desired values.

The transmitting device may instruct the microcontroller exit the charge state and return to the standby state, for example, sending an appropriate command (TX_STBY), to the microcontroller through the radio. The transmitting device may cause the microcontroller to exit the charge state, for example, if the value of LOAD drops below a predetermined threshold, which may indicate that power is no longer needed by the circuit connected to the output switch. For example, a battery being charged by a charging circuit connected to the output switch may be fully charged. The transmitting device may cause the microcontroller to exit the charge state and enter standby if the transmitting device intends to stop delivering power to the power generating mechanism for any suitable reason. The microcontroller may also exit the charge state if $V_{LOAD}$ falls below a predetermined threshold ($V_{LOAD\_TH\_FALL}$), which may be an indication that step down converter can no longer maintain $V_{LOAD}$ in regulation at the appropriate voltage level. The microcontroller may exit the charge state, enter the standby state, and send a message indicating that $V_{LOAD}$ dropped (RX_VLOAD_FAIL) to the transmitting device. Whenever the microcontroller exits the charge state, the microcontroller may cause the output switch to open.

The microcontroller may return to the dead state from the handshake state, standby state, and charge state. For example, the voltage (VDD) of the direct current signal supplied to the microcontroller through the linear regulator may drop below a brown-out threshold (VDD_TH_FALL) for the microcontroller, which may result in the microcontroller entering the dead state from whatever state it is in at the time the drop in VDD occurs. Drops in VDD may occur, for example, due to interruption in the power being delivered to the power generating mechanism from the transmitting device. For example, an ultrasonic beam may be blocked from reaching an ultrasonic transducer array by an obstructing object, or the amount of power delivered may be reduced due to environmental interference.

The power receiver circuit may be implemented using any suitable combination of hardware and software. For example, components of the power receiver circuit may be implemented in whole or in part as a field programmable gate array (FPGA) or application-specific integrated circuit (ASIC) or complex programmable logic device (CPLD), or using integrated circuit packages. Components of the power receiver circuit may be connected in any suitable manner. For example, connections between components may be implemented as traces on PCB, or using any other suitable type of electrical connection for carrying alternating current signals and direct current signals. Voltage levels of direct current signals may be approximate, or within suitable ranges of specified voltage levels. For example, the direct signal output at the target voltage level may vary in any suitable range around the target voltage level.

FIG. 1 shows an example system suitable for a power receiver circuit according to an implementation of the disclosed subject matter. A power receiver circuit 100 may include transducer element array 110, a static circuit 120, rectifier circuits 130 and 140, switch circuits 125 and 135, a voltage bus 150, and voltage conversion 160. The power receiver circuit 100 may be able to receive power transmitted wirelessly, for example, through optical, ultrasonic, or RF transmission, using the transducer element array 110.

The transducer element array 110 may be a power generating mechanism for the power receiver circuit 100. The transducer element array 110 may include any number of transducer elements, such as the transducer elements 111 and 112. The transducer elements 111 and 112 may be any suitable type of transducers for receiving power transmitted wirelessly in any suitable form. For example, the transducer elements 111 and 112 may be ultrasonic transducers, which may convert ultrasonic sound waves into AC. The transducer element array 110 may have a number of outputs for current equal to the number of elements in the transducer element array 110. The elements of the transducer element array 110 may each output current to a rectifier circuit, such as the rectifier circuits 130 and 140. The power receiver circuit 100 may include one rectifier circuit for each transducer element. Each rectifier circuit may include a single DC output. The current carried by the outputs of the rectifier circuits may be DC, converted from the AC input into the rectifier circuits from the transducer elements of the transducer element array 110.

The rectifier circuits may output current into the static circuit 120. The static circuit 120 may combine, in parallel or in series, the currents output from the rectifier circuits, such as the rectifier circuits 130 and 140. The currents may combined in any suitable manner. For example, the static circuit 120 may combine the currents output from separate groups of rectifier circuits, with each group of rectifier circuits having its own separate output from the static circuit 120. The outputs of the static circuit 120 may be connected to switch circuits, including the switch circuits 125 and 135. The current carried by the outputs of the static circuit 120 may be DC.

The power receiver circuit 100 may include any suitable number of switch circuits. The outputs from the static circuit 120 may be divided among the available switch circuits, including the switch circuits 125 and 135, in any suitable manner. For example, each switch circuit may be connected to the same number of outputs of the static circuit 120. Each switch circuit may have a number of outputs. Different outputs from the switch circuits may be assigned to carry current having different voltage levels. The number of outputs, and the voltages they carry, may be the same for each switch circuit. The outputs from the switch circuits may be connected to the voltage bus 150

The voltage bus 150 may include a number of outputs equal to the total number of different voltage levels output by the switch circuits. For example, if the switch circuit 125 include a separate output for each of five different voltage levels, the voltage bus 150 may include five separate outputs. The voltage bus 150 may combine the outputs of the switch circuits, including the switch circuits 125 and 135, by voltage level. The outputs of the voltage bus 150 may be connected to the voltage conversion 160.

The voltage conversion 160 may include a number of voltage converters. Each of the voltage converters in the voltage conversion 160 may receive one of the outputs of the voltage bus 150, and convert the DC carried by the output to DC of a set voltage level. For example, each voltage converter may convert the received DC to 5 Volt DC. The outputs of the voltage converters may be combined and output as a single current from the voltage conversion 160. The DC output from the voltage conversion 160 may be used to provide power to another device or mechanism, such as, for example, a charging circuit which may charge a battery.

Figure 2:
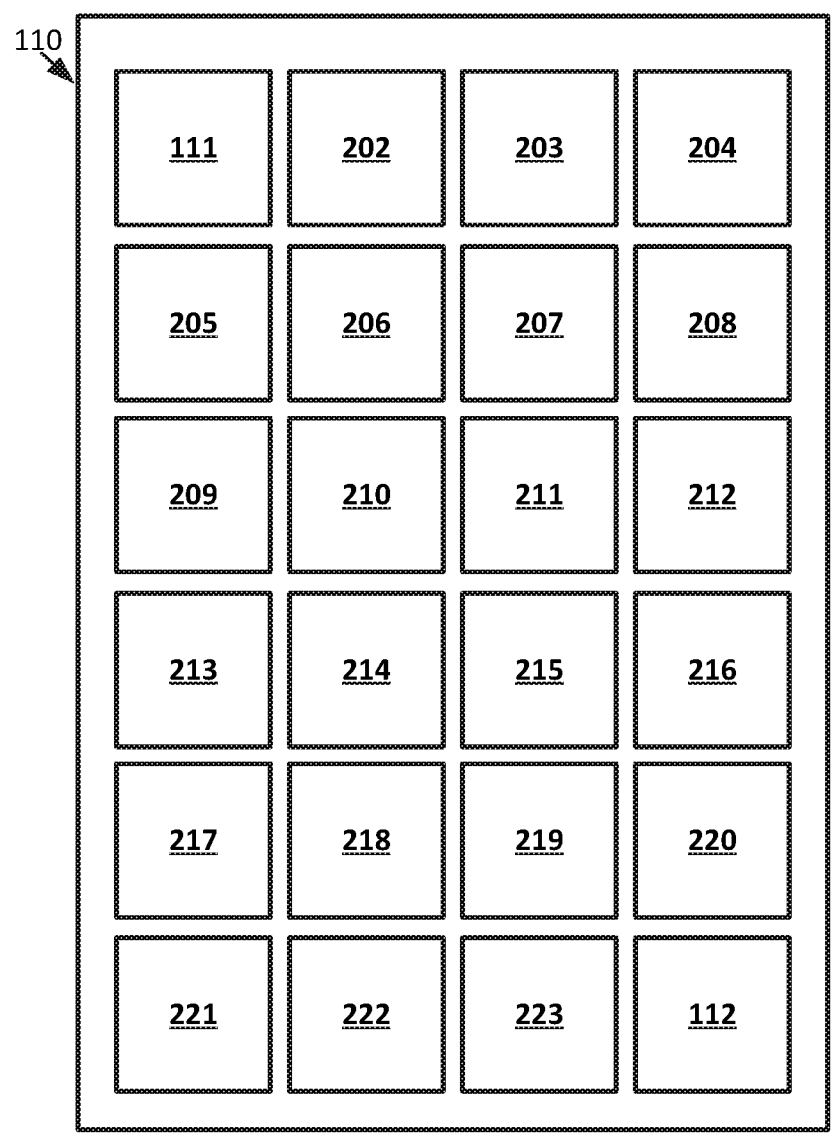
FIG. 2 shows an example system suitable for a power receiver circuit according to an implementation of the disclosed subject matter.

FIG. 2 shows an example system suitable for a power receiver circuit according to an implementation of the disclosed subject matter. The transducer element array 110 may include transducer elements 111, 202, 203, 204, 205, 206, 207, 208, 209, 210, 211, 212, 213, 214, 215, 216, 217, 218, 219, 220, 221, 222, 223, and 112, which may be any suitable type of transducers for receiving power transmitted wirelessly in any suitable form. For example, the transducer elements 111, 202 to 224, and 112 may be ultrasonic transducers, which may convert ultrasonic sound waves into AC.

Figure 3A:
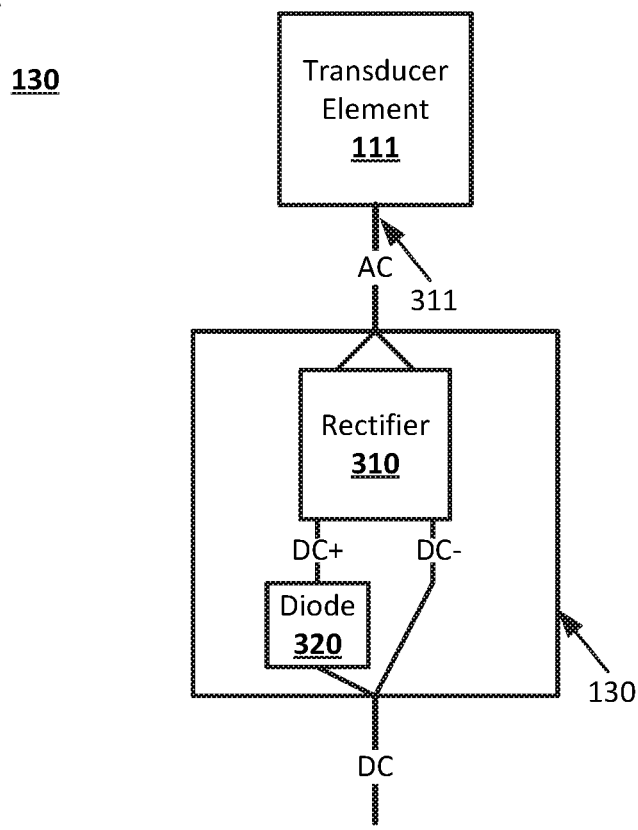
FIG. 3A shows an example system suitable for a power receiver circuit according to an implementation of the disclosed subject matter.

FIG. 3A shows an example system suitable for a power receiver circuit according to an implementation of the disclosed subject matter. The output 311 of the transducer element 111 may carry AC to the rectifier circuit 130. The output 311 may be connected to a rectifier 310 of the rectifier circuit 130. The rectifier 310 may receive the AC carried by the output 311, which may be the combined AC from the transducer elements 201, 202, 205, and 206, in the group 250. The rectifier 310 may convert the AC carried by the output 311 to DC. The rectifier 310 may use a diode bridge, Schottky diodes, diode-connected FETS, or may be any form of synchronous rectifier. A diode 320 may be connected to one side of the DC output of the rectifier 310. For example, the diode 320 may be connected to the positive side of the DC output of the rectifier 310. The diode 320 may be any suitable diode, connected in any suitable manner. The diode 320 may allow the DC outputs of multiple rectifier circuits to be combined, for example, in parallel, without dropping the voltage of the combined DC output to the lowest individual DC voltage output by one of the multiple rectifier circuits.

Figure 3B:
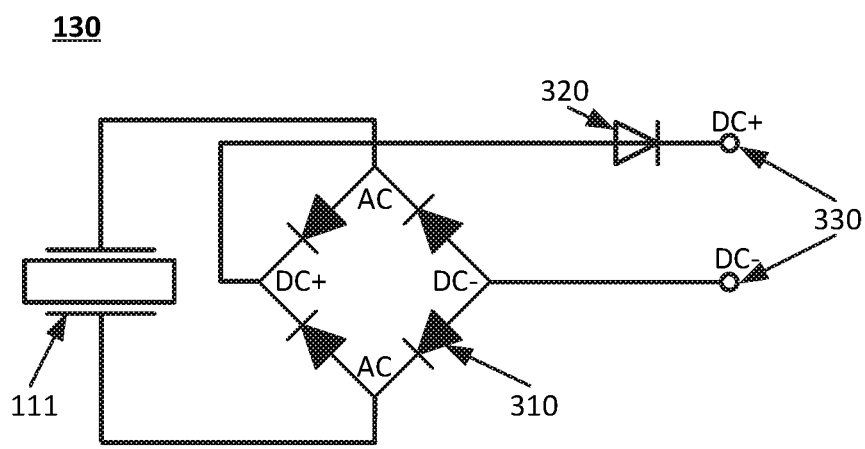
FIG. 3B shows an example system suitable for a power receiver circuit according to an implementation of the disclosed subject matter.

FIG. 3B shows an example system suitable for a power receiver circuit according to an implementation of the disclosed subject matter. The rectifier 310 of the rectifier circuit 130 may be, for example, a bridge rectifier. The rectifier 310 may be connected to the AC output leads from a transducer element 111, and may output DC to positive and negative DC output leads 330. The diode 320 may be attached to one of the DC output leads 330, for example, the positive DC lead.

Figure 4A:
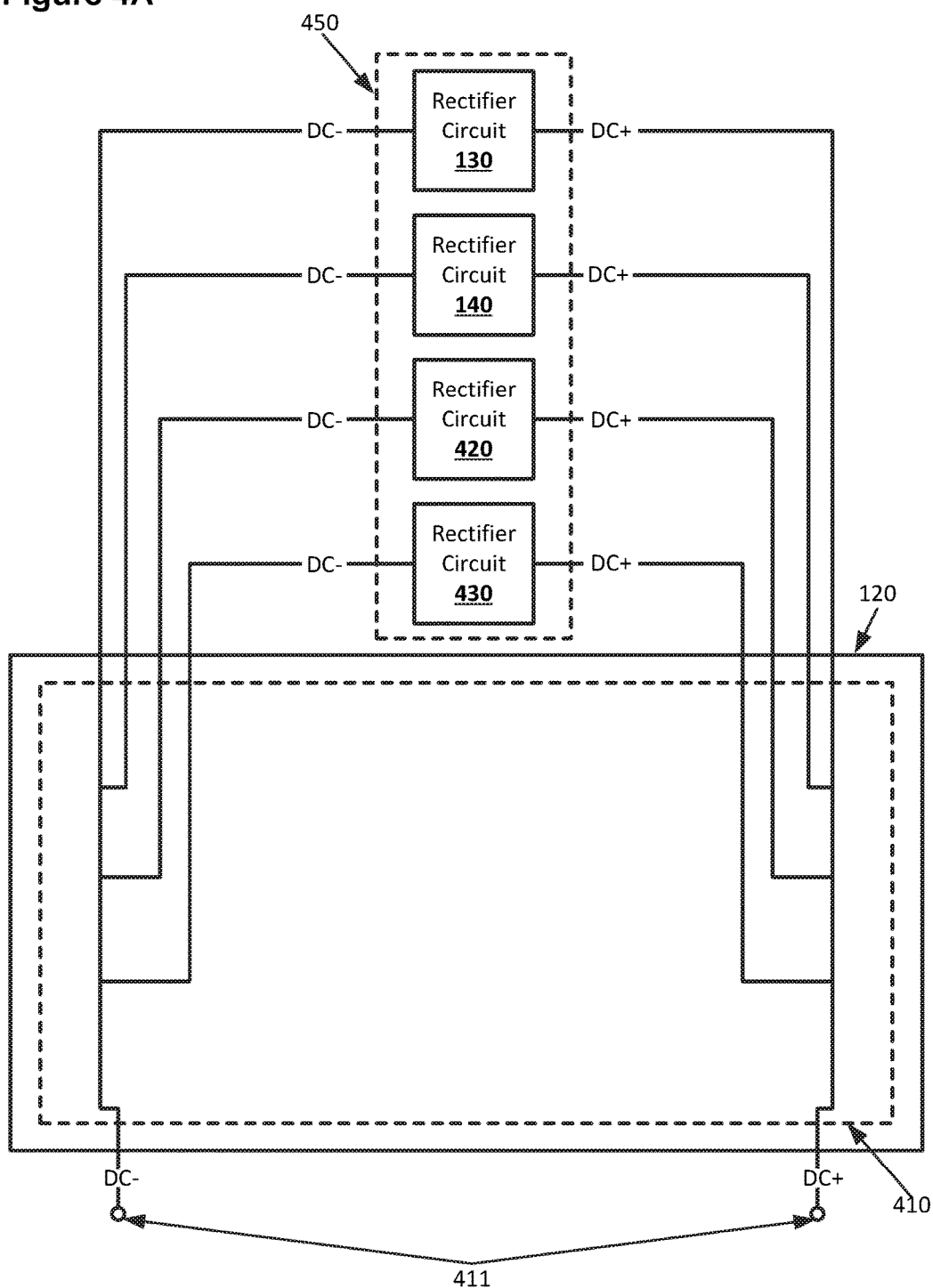
FIG. 4A shows an example system suitable for a power receiver circuit according to an implementation of the disclosed subject matter.

FIG. 4A shows an example system suitable for a power receiver circuit according to an implementation of the disclosed subject matter. The rectifier circuits, such as the rectifier circuits 130 and 140, may be connected to the static circuit 120. The static circuit 120 may include a separate group circuit, such as the group circuit 410 for each group of rectifier circuits, such as group 450 including the rectifier circuits 130, 140, 420, and 430. A group, such as the group 450, may include any suitable number of rectifier circuits. The group circuit 410 may connect the outputs of the rectifier circuits 130, 140, 420, and 420 of the group 450 in parallel. The combined output of the group 450 may be output from the static circuit 120 using the output 411 from the group circuit 410. The output 411 may carry current that is the combination of the DC generated by each of the rectifier circuits 130, 140, 420, and 420 of the group 450. Each group circuit of the static circuit 120 may include its own output, so that the number of outputs, such as the output 311, from the static circuit 120 may be equal to the number of transducer elements of the transducer element array 110, which may be the same as the number of rectifier circuits, divided by the number of rectifier circuits per group. In some implementations, groups may have different numbers of rectifier circuits, but the static circuit 120 may still include one output per group regardless of the number of rectifier circuits in each group. The static circuit 120 may be implemented in any suitable manner. For example, the static circuit 120 may be implemented with traces on any number of layers of a PCB which may include the transducer element array 110 and may also include the rectifier circuits, such as the rectifier circuits 130, 140, 420, and 430. The outputs from rectifier circuits may be electrically connected to the static circuit in any suitable manner. For example, traces and vias may be used to route connections through any number of layers of a PCB to connect each of the rectifier circuits to its group circuit in the static input network 120.

FIG. 4B shows an example system suitable for a power receiver circuit according to an implementation of the disclosed subject matter. The rectifier circuits, such as the rectifier circuits 130 and 140, may be connected to the static circuit 120. The static circuit 120 may include a separate group circuit, such as the group circuit 410 for each group of rectifier circuits, such as group 450 including the rectifier circuits 130, 140, 420, and 430. A group, such as the group 450, may include any suitable number of rectifier circuits. The group circuit 410 may connect the outputs of the rectifier circuits 130, 140, 420, and 420 of the group 450 in series. The combined output of the group 450 may be output from the static circuit 120 using the output 411 from the group circuit 410. The output 411 may carry current that is the combination of the DC generated by each of the rectifier circuits 130, 140, 420, and 420 of the group 450.

Figure 5:
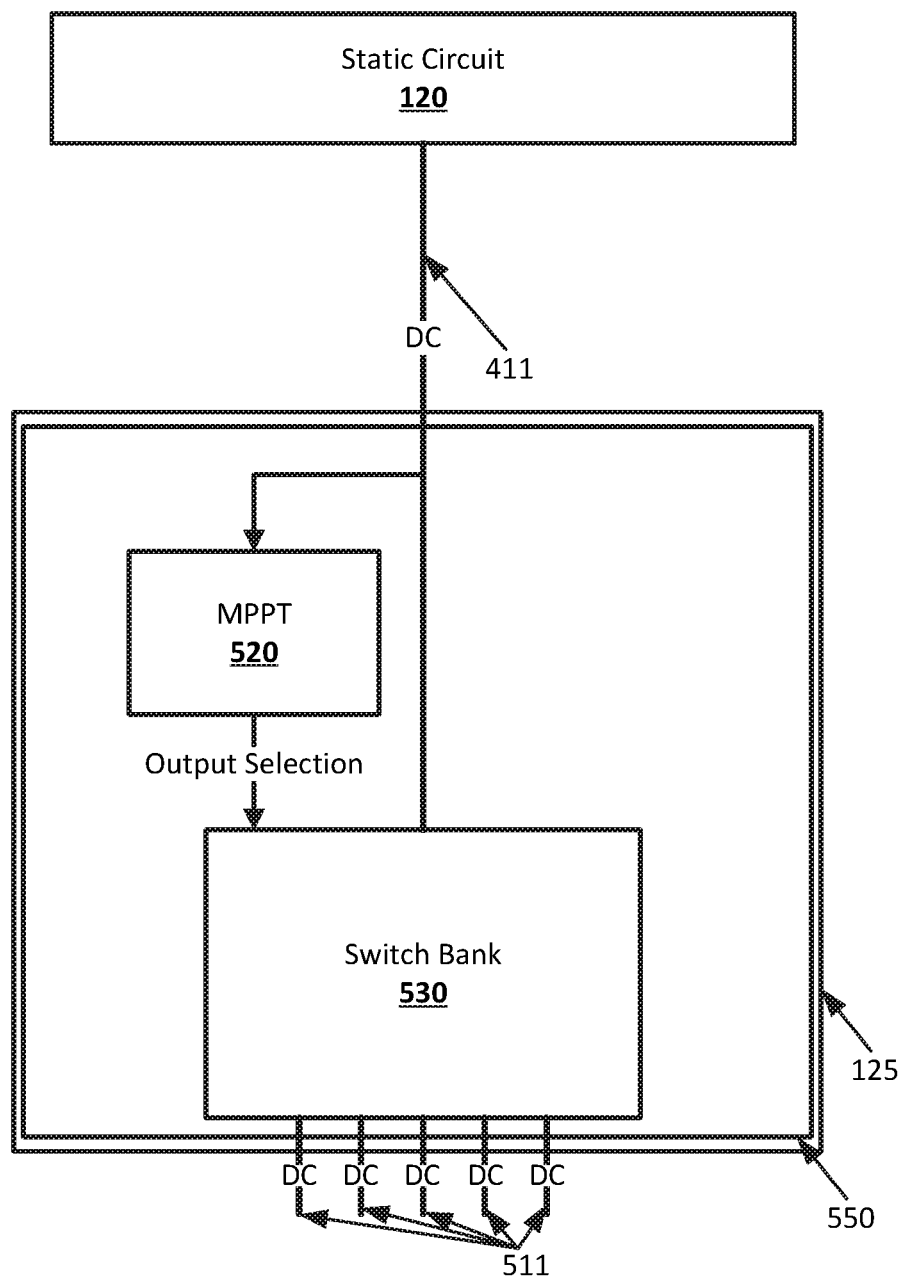
FIG. 5 shows an example system suitable for a power receiver circuit according to an implementation of the disclosed subject matter.

FIG. 5 shows an example system suitable for a power receiver circuit according to an implementation of the disclosed subject matter. The output 411 of the static circuit 120 may carry DC to the switch circuit 125. The output 411 may be connected to a switch channel 550 of the switch circuit 125. The switch channel 550 may include an MPPT 520 and a switch bank 530. The switch bank 530 may be connected to the output 411, which may carry DC from a group circuit, such as the group circuit 410, of the static input 120. The switch bank 120 may include any suitable number of DC outputs 511 which may each be assigned a different voltage level. The voltage of the DC output by the switch bank 530 may be determined by the output 511 of the switch bank 530 selected by an MPPT 520. The MPPT 520 may monitor the voltage of the DC carried by the output 511 from the static input 120 and select an output of the switch bank 530 in any suitable manner. The selected output 511 may be based on the voltage level that will maximize the power transferred out of the switch channel 550. The MPPT 420 may measure the voltage of the DC carried by the output 411 to the switch bank 530 and select an output 511 from the switch bank 530 based on the measured voltage, or may, instead of directly monitoring the output 411, iteratively select each of the available outputs 511 of the switch bank 530, measure the power transfer achieved through each of the outputs 511, and then select the output 511 that exhibits the maximum power transfer. The MPPT 520 may select an output 511 of the switch bank 530 at any suitable interval and at any suitable rate, and may leave an output 511 selected for any suitable length of time before selecting a different output 511.

The outputs 511 of the switch bank 530 may be assigned any suitable voltage levels. For example, the switch bank 530 may include five outputs 411, which may be 6 Volts, 10 Volts, 14 Volts, 18 Volts, and 22 Volts. The voltage level of the DC carried by the output 511 may be the voltage level assigned to the output 511 selected by the MPPT 520. For example, if the MPPT 520 selects the output 511 assigned 14 Volts, the DC output by carried by the output 411 to the switch bank 530 may be, or be within any suitable range of, 14 Volts. The DC output carried by the output 411 may not be at the voltage level of the selected output 511 immediately, for example, if a capacitor that charges using the DC output by the switch bank 530 is not sufficiently charged, and may reach the selected voltage when the capacitor has reached the appropriate charge level.

The switch circuit 125 may have any suitable number switch channels, such as the switch channel 550. Each switch channel may receive DC from a separate group circuit of the static circuit 120, and may output DC on an output selected from that switch channel's switch bank based on voltage level by that switch channel's MPPT. The voltage levels assigned to the outputs of the switch banks may be the same across each switch channel of the switch circuit 125. The outputs of the switch banks may be combined by assigned voltage level, so that the total number of outputs from the switch circuit 125 may be equal to the number of distinct voltage levels assigned to the outputs 511. For example, if the switch bank 530 has five outputs 511, the switch circuit 125 may have five outputs, which may combine the outputs 511 of the switch bank 530 with corresponding outputs assigned the same voltage from switch banks from other switch channels of the switch circuit 125. For example, if the switch circuit 125 has ten switch channels and each switch channel's switch bank has five outputs 6 Volts, 10 Volts, 14 Volts, 18 Volts, and 22 Volts, the switch circuit 125 may have five outputs at 6 Volts, 10 Volts, 14 Volts, 18 Volts, and 22 Volts. The 6 Volt output from the switch circuit 125 may combine the 6 Volt outputs from the ten switch banks of the switch circuit 125. The 10 Volt output from the switch circuit 125 may combine the 10 Volt outputs from the ten switch banks of the switch circuit 125, and similarly for the 14 Volt, 18 Volt, and 22 Volt outputs.

The switch circuit 125 and switch channels, such as the switch channel 550, may be implemented in any suitable manner. For example, the switch circuit 125 may be implemented as an ASIC. Each switch channel, such as the switch channel 550, may be implemented in the ASIC for the switch circuit 125. The ASIC for the switch circuit 125 may be, for example, installed on the same PCB that includes the static circuit 120. The power receiver circuit 100 may include an ASIC for each switch circuit.

Figure 6:
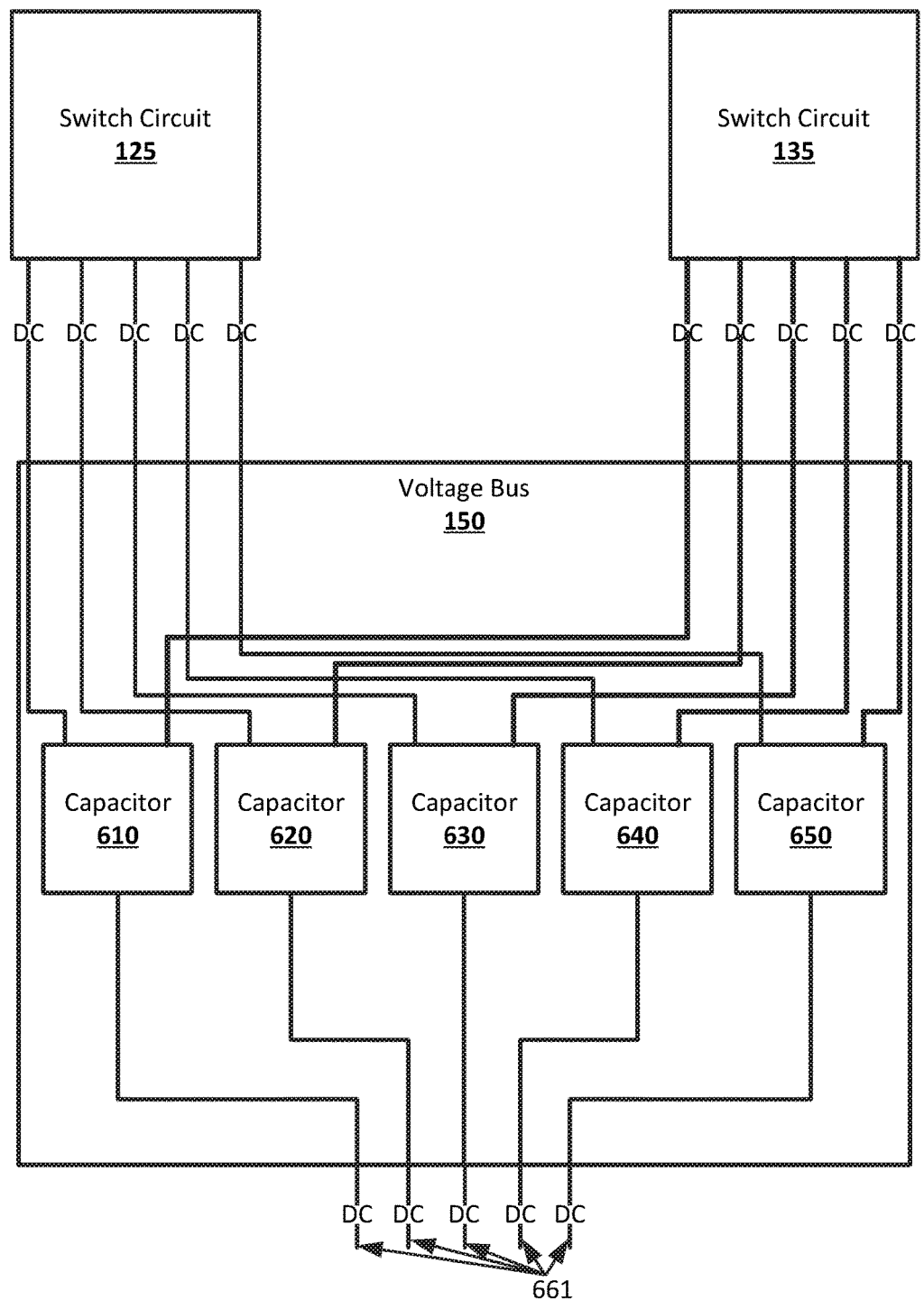
FIG. 6 shows an example system suitable for a power receiver circuit according to an implementation of the disclosed subject matter.

FIG. 6 shows an example system suitable for a power receiver circuit according to an implementation of the disclosed subject matter. The voltage bus 150 may be connected to the outputs of the switch circuits, such as the switch circuit 125 and 135. The voltage bus 150 may include a number of capacitors equal to the number of outputs from each switch circuit. For example, the voltage bus 150 may include capacitors 610, 620, 630, 640, and 650. Each of the capacitors 610, 620, 630, 640, and 650 may receive all of the outputs from the switch circuits at a particular voltage level. For example, if each of the switch circuits has five outputs at 6 Volts, 10 Volts, 14 Volts, 18 Volts, and 22 Volts, the capacitor 610 may receive all 6 Volt outputs, the capacitor 620 may receive all 10 Volt outputs, the capacitor 630 may receive all 14 Volt outputs, the capacitor 640 may receive all 18 Volt outputs, and the capacitor 650 may receive all 22 Volt outputs. Each of the capacitors 610, 620, 630, 640, and 650 may charge using the DC carried by the outputs from the switch circuits, and may output DC on the outputs 661. The voltage of the DC carried on the output 661 for one of the capacitors 610, 620, 630, 640, or 650 may be the voltage of the outputs from the switch circuits connected to that capacitor when that capacitor is sufficiently charged.

Figure 7:
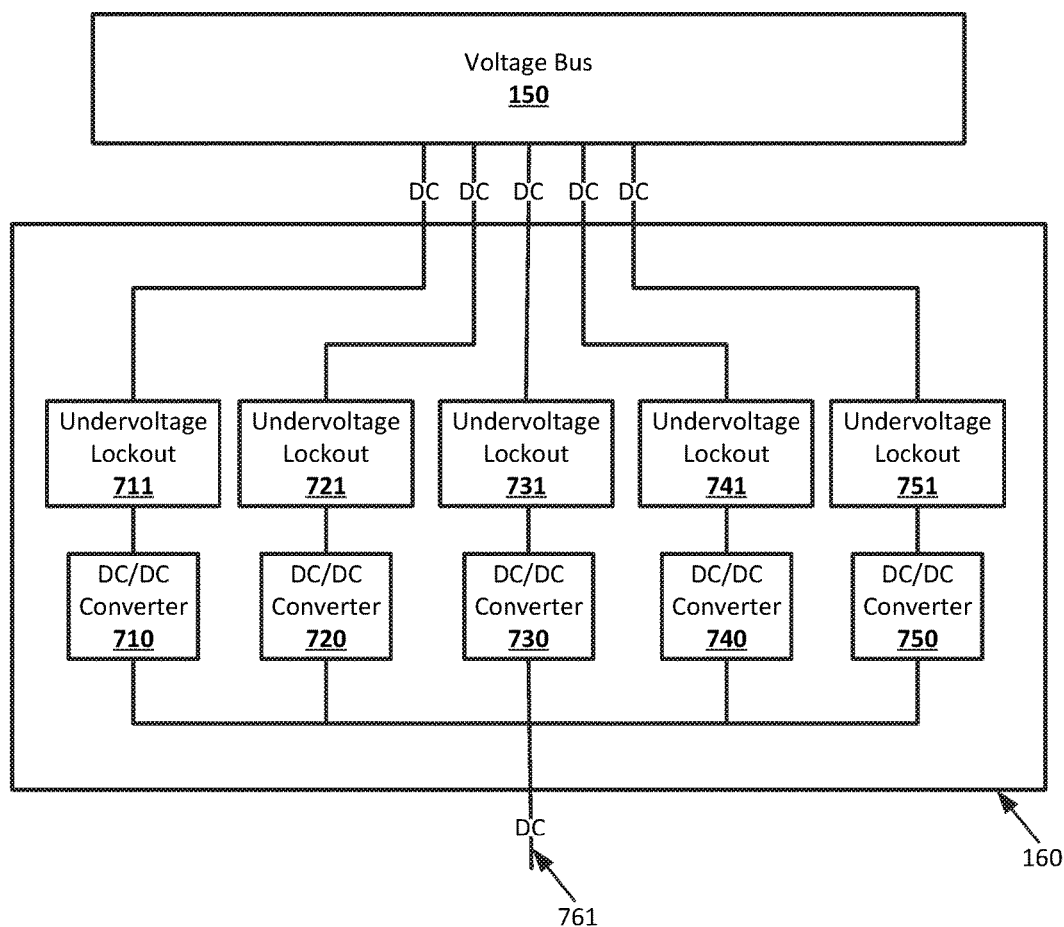
FIG. 7 shows an example system suitable for a power receiver circuit according to an implementation of the disclosed subject matter.

FIG. 7 shows an example system suitable for a power receiver circuit according to an implementation of the disclosed subject matter. The outputs from the voltage bus 150 may carry DC to the voltage conversion 160. The voltage conversion 160 may include a number of DC/DC converters equal to the number of capacitors of the voltage bus 150. For example, the voltage conversion 160 may include DC/DC converters 710, 720, 730, 740, and 750. The outputs from the voltage bus 150 may be connected to undervoltage lockouts, which may in turn be connected to the DC/DC converters. For example, the undervoltage lockouts 711, 721, 731, 741, and 751 may each receive one of the outputs from the voltage bus 150, and may be connected to a respective one of the capacitors 710, 720, 730, 740, and 750. The undervoltage lockouts 711, 721, 731, 741, and 751 may detect voltage levels of the output from the capacitors 710, 520, 530, 540, and 550, respectively, of the voltage bus 150, and may disconnect respective DC/DC converter 710, 720, 730, 740, or 750 if the voltage level drops below a threshold, and reconnect respective DC/DC converter 710, 720, 730, 740, or 750 when the voltage level returns above the threshold. This may allow the undervoltage lockouts 711, 721, 731, 741, and 751 to maintain the voltage levels assigned to the outputs, such as the outputs 511, of each of the switch banks, such as the switch bank 430, and cause the group circuits to output DC at the voltage levels assigned to the outputs currently selected from the switch banks connected to the group circuits.

For example, the capacitor 610 may receive the 6 Volt outputs from the switch circuits. The undervoltage lockout 711 may monitor the voltage of the DC output by the capacitor 610. The undervoltage lockout 711 may break the connection between the DC/DC converter 710 and the capacitor 610 that goes through the undervoltage lockout 711 if the voltage level of the DC output by the capacitor 610 falls below a threshold, which may be 6 Volts, or may be under 6 Volts by any suitable amount. This may allow the capacitor 610 to charge from the DC output by the group circuits. The undervoltage lockout may reconnect the DC/DC converter 710 to the capacitor 610 when the voltage level of the DC output by the capacitor 610 has returned to the threshold, or to some level above the threshold, for example, after the capacitor is sufficiently charged. The undervoltage lockout 711 may maintain the assigned voltage level between the DC/DC converter 710, the 6 Volt output 511 of the switch bank 530 that was assigned the voltage level of 6 Volts, and the group circuit when the MPPT 520 selects the 6 Volt output 511.

The DC/DC converters 710, 720, 730, 740, and 750 may convert DC at respective voltage levels, for example, as set by the undervoltage lockouts 711, 721, 731, 741, and 751, to the DC of the same voltage level, which may be a target voltage level for the power receiver circuit 100. For example, the DC/DC converters 710, 720, 730, 740, and 750 may convert, respectively, 6 Volt DC, 10 Volt DC, 14 Volt DC, 18 Volt DC, and 22 Volt DC to 5 Volt DC. The DC of the same voltage level output from the DC/DC converters 710, 720, 730, 740, and 750 may be combined and carried out of the voltage conversion 160 by the output 761. The output 761 may carry DC at the target voltage level, for example 5 Volts, out of the power receiver circuit 100 and to a circuit that may utilize the DC in any suitable manner. For example, the output 761 may carry DC to a charging circuit for a battery, where the DC may be used to charge the battery. The DC carried by the output 761 may also be used, for example, to power any suitable electronic or electric component, including, for example, microcontrollers, microprocessors, ASICS, FPGAs, actuators, switches, and motors.

Figure 8:
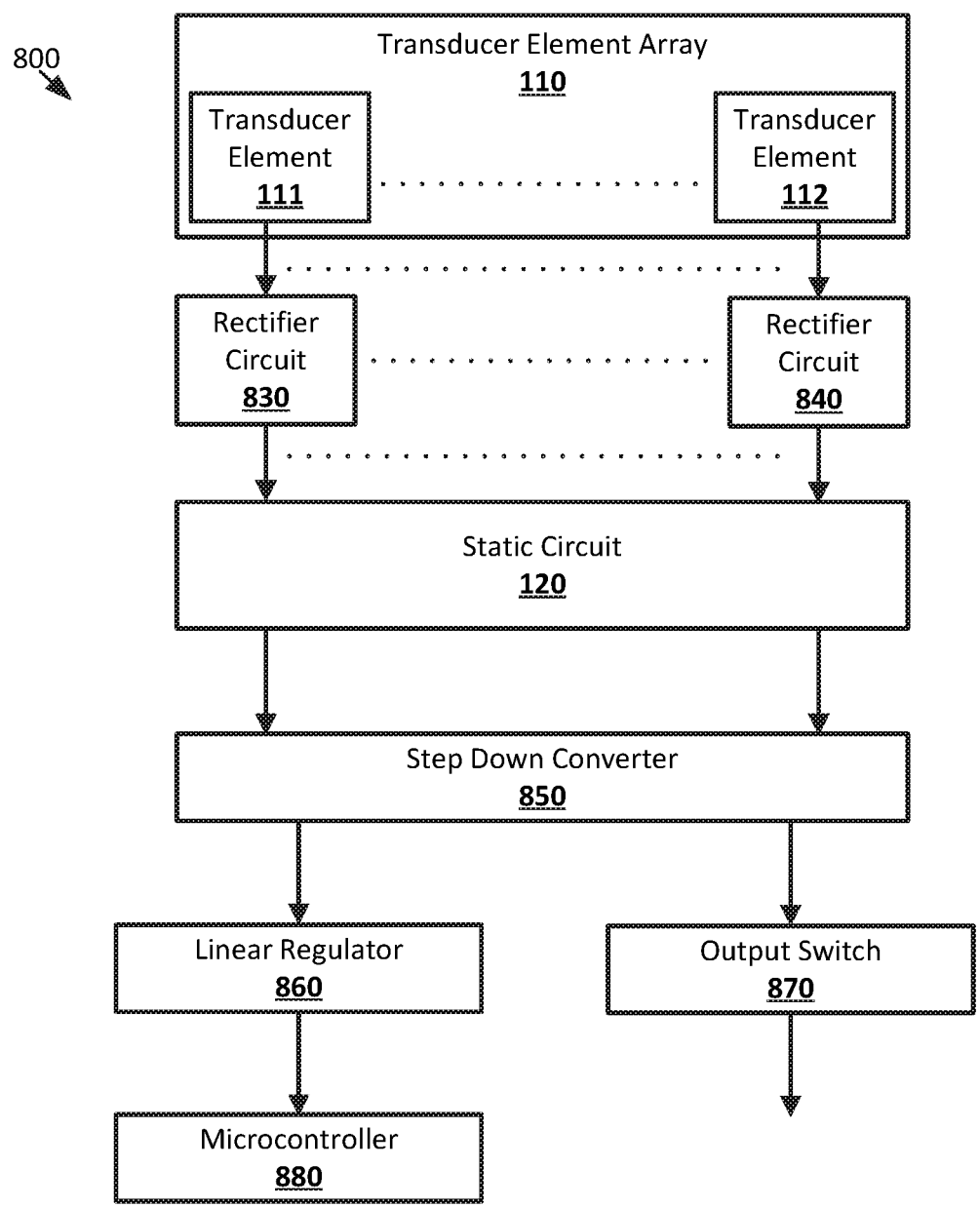
FIG. 8 shows an example system suitable for a power receiver circuit according to an implementation of the disclosed subject matter.

FIG. 8 shows an example system suitable for a power receiver circuit according to an implementation of the disclosed subject matter. A power receiver circuit 800 may include the transducer element array 110, the static circuit 120, rectifier circuits 830 and 840, a step down converter 850, a linear regulator 860, an output switch 870, and a controller 880. The power receiver circuit 800 may be able to receive power transmitted wirelessly, for example, through optical, ultrasonic, or RF transmission, using the transducer element array 110.

The transducer element array 110 may have a number of outputs for current equal to the number of elements, such as the transducer elements 111 and 112, in the transducer element array 110. The elements of the transducer element array 110 may each output current to a rectifier circuit, such as the rectifier circuits 830 and 840. The power receiver circuit 100 may include one rectifier circuit for each transducer element. Each rectifier circuit may include a single DC output. The current carried by the outputs of the rectifier circuits may be DC, converted from the AC input into the rectifier circuits from the transducer elements of the transducer element array 110.

The rectifier circuits may output current into the static circuit 120. The static circuit 120 may combine, in parallel or in series, the currents output from rectifier circuits, such as the rectifier circuits 830 and 840. The currents may combined in any suitable manner. For example, the static circuit 120 may combine the currents output from separate groups rectifier circuits, with each group of rectifier circuits having its own separate output from the static circuit 120. The outputs of the static circuit 120 may be connected to rectifier circuits, including the rectifier circuits 830 and 840. The current carried by the outputs of the static circuit 120 may be DC.

The outputs from the static circuit 120 may be combined and connected to the step down converter 850. The current carried by the outputs of the static circuit 120 may be DC. The step down converter 850 may be any suitable step down converter or transformer, and may convert the DC carried by the output from the rectifiers, including the rectifiers 830 and 840, to a specified, target, voltage level. For example, the step down converter 850 may convert received DC of any voltage level to DC of 5 Volts. The output of the step down converter 850 may be connected to the linear regulator 860 and the output switch 870.

The linear regulator 860 may convert DC received from the step down converter 850 to a DC of a voltage level suitable for operating the microcontroller 880. The microcontroller 880 may operate off the DC supplied through the linear regulator 860, and may monitor various voltage and amperage levels of the power receiver circuit 800. The microcontroller 880 may control the output switch 870, enabling and disabling the output switch 870.

The output switch 870 may be used to provide power to another device or mechanism, such as, for example, a charging circuit which may charge a battery. When the output switch 870 is enabled, DC from the step down converter 850 may be allowed to exit the power receiver circuit 800 through the output switch 870, where it may be utilized by another circuit. When the output switch 870 is disabled, no current may flow out of the power receiver circuit 800.

Figure 9:
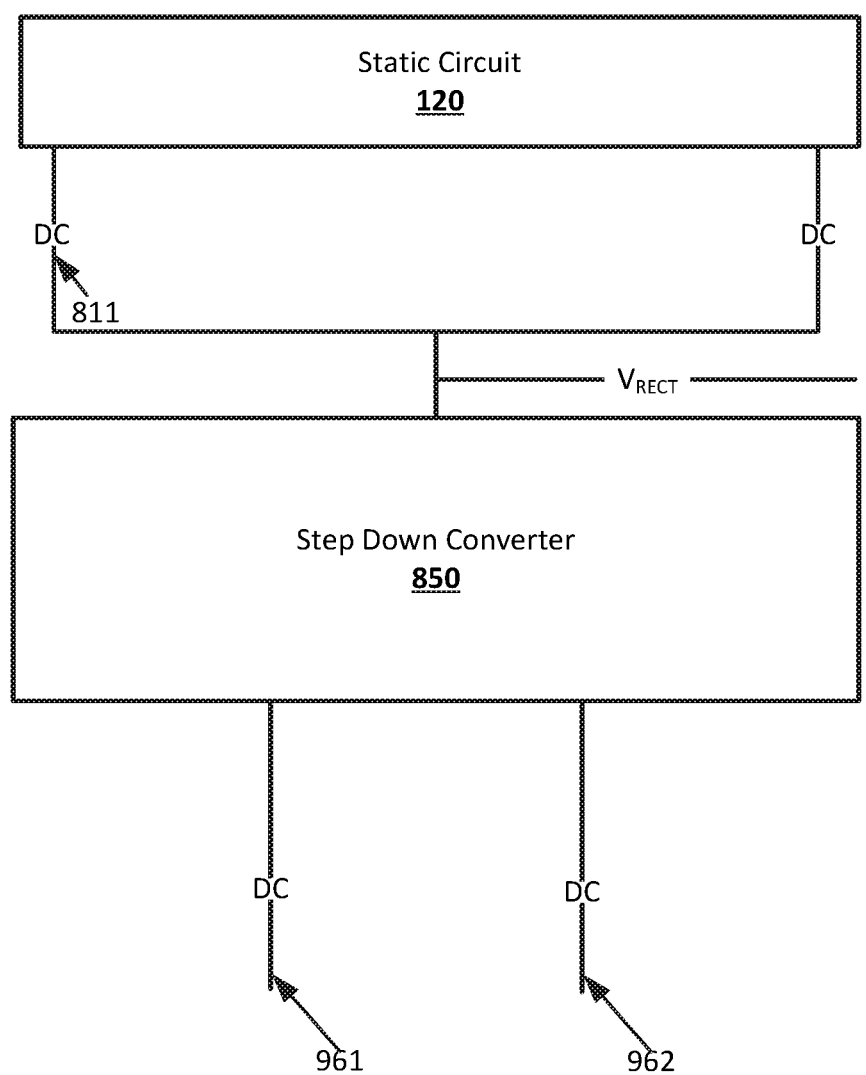
FIG. 9 shows an example system suitable for a power receiver circuit according to an implementation of the disclosed subject matter.

FIG. 9 shows an example system suitable for a power receiver circuit according to an implementation of the disclosed subject matter. The step down converter 850 may be connected to the outputs, such as the output 811, of the static circuit 120. The static circuit 120 may receive DC from the rectifier circuits, such as the rectifier circuits 830 and 840, which may receive AC output from the elements of the transducer element array 110 and convert it to DC. The outputs from various transducer elements may be combined in series or in parallel in group circuits of the static circuit 120. The step down converter 850 may receive the DC output from the group circuits of the static circuit 120 through outputs such as the output 811. The outputs of the group circuits of the static circuit 120 may be combined when being input into the step down converter 850.

The step down converter 850 may be a converter or transformer of any suitable type, and may convert DC of any voltage level received from the static circuit 120 to DC having a target voltage level, such as, for example, 5 Volts. The step down converter 850 may output DC at the target voltage level. The output from the step down converter 850 may be split, inside or outside of the step down converter 850, to outputs 961 and 962. The DC input into the step down converter 850 from the static input circuit 120, which may combine all of the outputs of all of the group circuits of the static circuit 120, may have a voltmeter connected in parallel that may be used to measure the voltage of the output from the static circuit 120, $V_{RECT}$, which may be the result of combining the DC output from the rectifier circuits.

Figure 10:
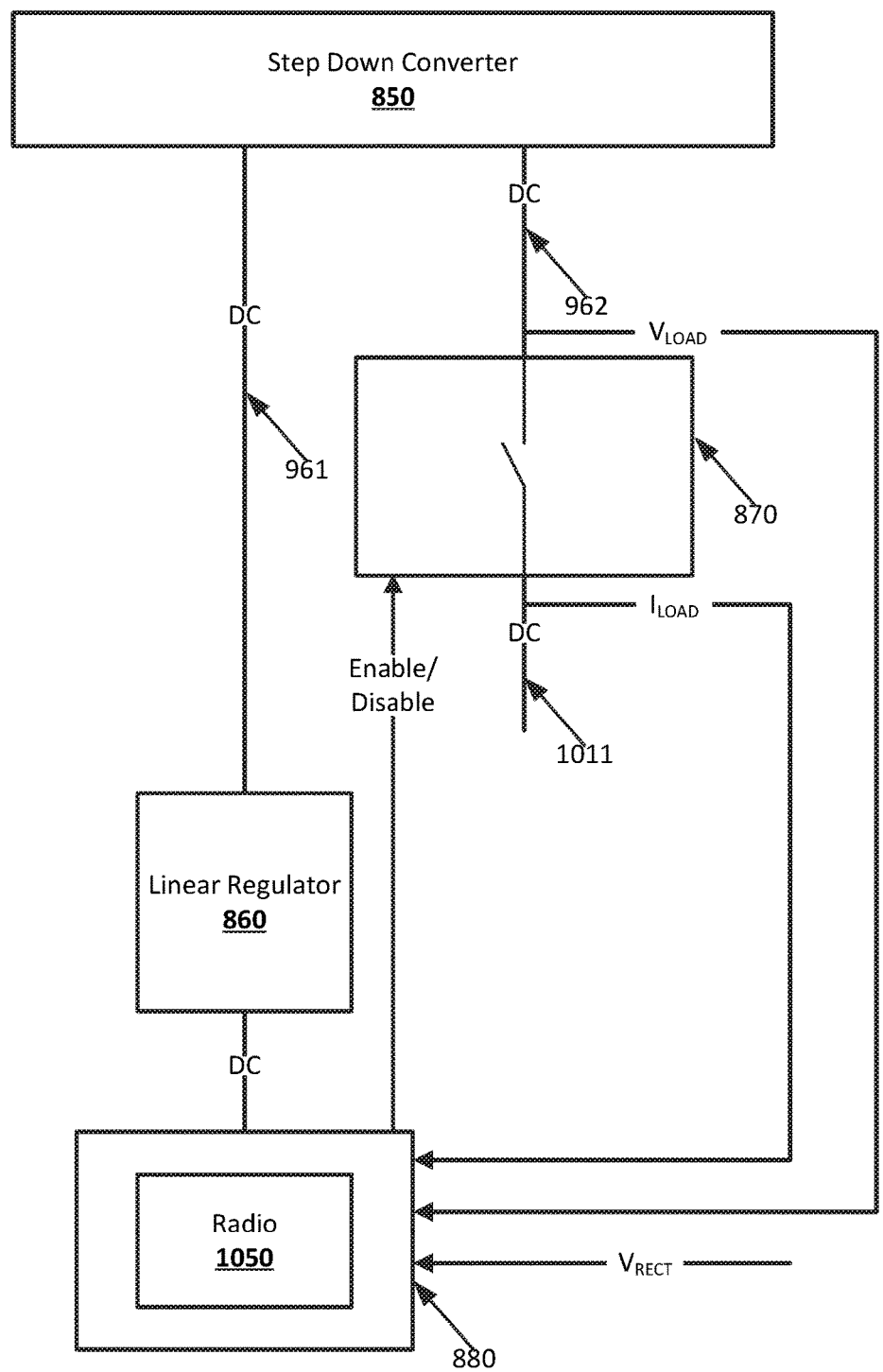
FIG. 10 shows an example system suitable for a power receiver circuit according to an implementation of the disclosed subject matter.

FIG. 10 shows an example system suitable for a power receiver circuit according to an implementation of the disclosed subject matter. The linear regulator 860 may receive DC carried by the output 961 from the step down converter 850. The linear regulator 860 may be any suitable device, component, or circuit to convert the DC output by the step down converter 850 to DC of a native voltage level for the microcontroller 880. The output of the linear regulator 860 may be connected to the microcontroller 880. When the linear regulator 860 receives DC of an appropriate voltage level from the step down converter 850, the linear regulator 860 may output enough power at an appropriate voltage to operate the microcontroller 880.

The output switch 870 may receive DC carried by the output 962 from the step down converter 850. The output 1011 of the output switch 870 may be the output for the power receiver circuit 800, and may carry DC which may be used by any suitable electric or electronic component, such as, for example, a charging circuit for a battery, microcontrollers, microprocessors, ASICs, FPGAs, actuators, switches, and motors. When the output switch 870 is closed, the output 1011 may carry DC out of the power receiver circuit 800. When the output switch 870 is open, no DC may be carried out of the power receiver circuit 800 on the output 1011. The opening and closing of the output switch 870 may be controlled by the microcontroller 880.

The microcontroller 880 may be any suitable electronic microcontroller, and may include an integrated analog-to-digital converter and radio 1050. The microcontroller 880 may be powered by DC from the linear regulator 860. The microcontroller 880 may monitor the operation of the power receiver circuit 800. A voltmeter may be connected in parallel with the step down converter 850, and may measure the voltage $V_{RECT}$ of the DC being output from the static circuit 120. The measurement of the voltage $V_{RECT}$ of the DC being output from the static circuit 120, into the step down converter 850, may be input into the microcontroller 880. The voltmeter for measuring $V_{RECT}$ may be implemented as part of the microcontroller 880, or separately from the microcontroller 880, with the microcontroller 880 receiving the measurements output by the voltmeter. A voltmeter may be connected in parallel with the output switch 870, and may measure the voltage $V_{LOAD}$ of the DC being output from the step down converter 850 to the output switch 870. The measurement of the voltage $V_{LOAD}$ of the DC being output from the step down converter 850 may be input into the microcontroller 880. The voltmeter for measuring $V_{LOAD}$ may be implemented as part of the microcontroller 880, or separately from the microcontroller 880, with the microcontroller 880 receiving the measurements output by the voltmeter. An ammeter may be connected to the output 1011 from the output switch 870, and may measure the amperage $I_{LOAD}$ of the DC being output from the output switch 870. The measurement of the amperage $I_{LOAD}$ of the DC being output from the output switch 870 may be input into the microcontroller 880. The ammeter for measuring LOAD may be implemented as part of the microcontroller 880, or separately from the microcontroller 880, with the microcontroller 880 receiving the measurements output by the ammeter.

The microcontroller 880 may use the radio 1050 to communicate with a transmitting device that transmits wireless power to the transducer element array 110, for example to report $V_{RECT}$, $V_{LOAD}$, and $I_{OUT}$, so that the transmitting device may adjust the delivery of wireless power to the transducer element array 110. The microcontroller 880 may control the opening and closing of the output switch 870, for example, through an enable/disable line. The microcontroller 880 may open and close the output switch 870 based on any suitable criteria, including, for example, based on instructions received through the radio 1050, or based on the measurements of $V_{RECT}$, $V_{LOAD}$, and $I_{OUT}$.

Figure 11:
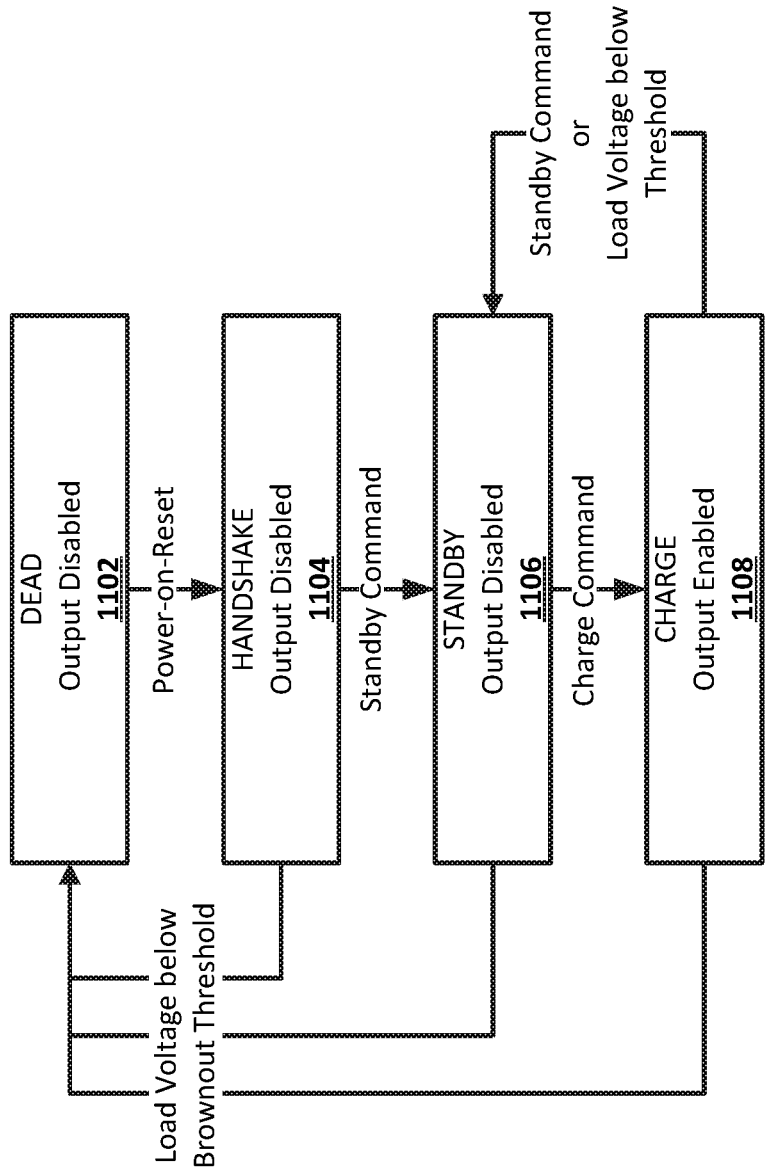
FIG. 11 shows an example arrangement suitable for a power receiver circuit according to an implementation of the disclosed subject matter.

FIG. 11 shows an example arrangement suitable for a power receiver circuit according to an implementation of the disclosed subject matter. The microcontroller 880 may implement a state machine which may include a DEAD state 1102, HANDSHAKE state 1104, STANDBY state 1106, and CHARGE state 1106. The microcontroller 880 may be in the DEAD state 1102 when not enough power is delivered by the linear regulator 860 to operate the microcontroller 880. For example, the transducer element array 110 may not generate enough power to generate sufficient current and voltage through the step down converter 850 to operate the microcontroller 880. When the microcontroller 880 is in the DEAD state 1102, the output switch 870 may be open, and the output 1011 may not carry any current out of the power receiver circuit 800. The microcontroller 880 may exit the DEAD state 1102 and enter the HANDSHAKE state 1104 when sufficient power is supplied to the microcontroller 880 by the linear regulator 860. For example, when the transducer element array 110 generates enough power to provide DC of sufficient voltage to the microcontroller 880 through the rectifier circuits, the step down converter 850, and linear regulator 860, the microcontroller 880 may generate a power-on-reset signal and enter the HANDSHAKE state 1104.

In the HANDSHAKE state 1104, the microcontroller 880 may use the radio 1050 to communicate with the transmitting device. The radio 1050 may communicate any suitable data to the transmitting device, including, for example, data regarding characteristics of the transducer element array 110 that may be used by the transmitting device to adjust various aspects of power delivered to the transducer element array 110. For example, the radio 1050 may communicate data that indicates the presence of the transducer element array 110, the location of the transducer element array 110, and may authenticate the power receiver circuit 800 to the transmitting device, which may only transmit power to the transducer element array 110 of an authenticated power receiver circuit 800. When the microcontroller 880 is in the STANDBY state 1104, the output switch 870 may be open, and the output 1011 may not carry any current out of the power receiver circuit 800. Once communication has been established with the transmitting device, the microcontroller 880 may enter the STANDBY state 1106. The microcontroller 880 may enter the STANDBY state 1106 in response to receiving an instruction, TX_STBY, from the transmitting device.

In the STANDBY state 1106, the microcontroller 880 may use the radio 1050 to communicate with the transmitting device. The communication may be periodic, and may include any suitable data, such as, for example $V_{RECT}$ and $V_{LOAD}$ values as determined by the microcontroller 880. When the microcontroller 880 is in the STANDBY state 1106, the output switch 870 may be open, and the output 1011 may not carry any current out of the power receiver circuit 800. The transmitting device may use the data received from the microcontroller 880 to adjust the delivery of power to the transducer element array 110 in any suitable manner. For example, the transmitting device may adjust the phase, amplitude, focus, and steering of an ultrasonic beam directed at an ultrasonic transducer array. The transmitting device may determine the minimum amount of power that can be delivered to the transducer element array 110 to allow the power receiver circuit 800 to output a useful amount of power. For example, the transmitting device may determine the minimum amount of power needed to allow the power receiver circuit 800 to charge a device battery through a charging circuit that receives power output by the power receiver circuit 800 through the output 1011 of the output switch 870. The transmitting device may, for example, compare received $V_{RECT}$ values to the predetermined threshold for static circuit 120 voltage $V_{RECT\_TH}$ and determine the minimum power that can be delivered to the transducer element array 110 to maintain $V_{RECT} > V_{RECT\_TH}$ at the output of the static circuit 120. When the transmitting device has determined the minimum power that it needs to deliver, the transmitting device may instruct the microcontroller 880 to enter the CHARGE state 1108, for example, sending an instruction TX_CHARGE, to the microcontroller 880 through the radio 1050.

In the CHARGE state 1108, the microcontroller 880 may cause the output switch 870 to close, allowing the power receiver circuit 800 to deliver power to a suitable circuit, such as a charging circuit for a battery, connected to the output 1011 of the output switch 870. The power delivered by the closed output switch 870 through the output 1011 may have the same voltage level $V_{LOAD}$ as the DC output from the step down converter 850, which may be, for example, 5 Volts, and may have amperage $I_{LOAD}$. The microcontroller 880 may continue to communicate with the transmitting device through the radio 1050 while in the CHAGE state 1108. For example, the microcontroller 880 may send $V_{RECT}$, $V_{LOAD}$, and $I_{LOAD}$ values to the transmitting device, which may make adjustments to the power delivered to the transducer element array 110 to maintain $V_{RECT}$, $V_{LOAD}$, and $I_{LOAD}$ at desired values.

The transmitting device may instruct the microcontroller 880 exit the CHARGE state 1108 and return to the STANDBY state 1106, for example, sending the command TX_STBY, to the microcontroller 880 through the radio 1050. The transmitting device may cause the microcontroller 880 to exit the CHARGE state 1108, for example, if the value of LOAD drops below a predetermined threshold, which may indicate that power is no longer needed by the circuit connected to the output 1011 of the output switch 870. For example, a battery being charged by a charging circuit connected to the output 1011 of the output switch 870 may be fully charged. The transmitting device may cause the microcontroller 880 to exit the CHARGE state 1108 and enter the STANDBY state 1106 if the transmitting device intends to stop delivering power to the transducer element array 110 for any suitable reason. The microcontroller 880 may also exit the CHARGE state 1108 if $V_{LOAD}$ falls below the predetermined threshold $V_{LOAD\_TH\_FALL}$, which may be an indication that step down converter 850 can no longer maintain $V_{LOAD}$ in regulation at the appropriate voltage level. The microcontroller 880 may exit the CHARGE state 1108, enter the STANDBY state 1106, and send a message RX_VLOAD_FAIL indicating that $V_{LOAD}$ dropped to the transmitting device. Whenever the microcontroller 880 exits the charge state, the microcontroller 880 may cause the output switch 870 to open.

The microcontroller 880 may return to the DEAD state 1102 from the HANDSHAKE state 1104, STANDBY state 1106, and CHARGE state 1108. For example, the voltage VDD of the power supplied to the microcontroller 880 through the linear regulator 860 may drop below the brown-out threshold VDD_TH_FALL for the microcontroller 880, which may result in the microcontroller 880 entering the DEAD state 1102 from whatever state is in at the time the drop in VDD occurs. Drops in VDD may occur, for example, due to interruption in the power being delivered to the transducer element array 110 from the transmitting device. For example, an ultrasonic beam may be blocked from reaching an ultrasonic transducer array by an obstructing object, or the amount of power delivered may be reduced due to environmental interference.

Figure 12:
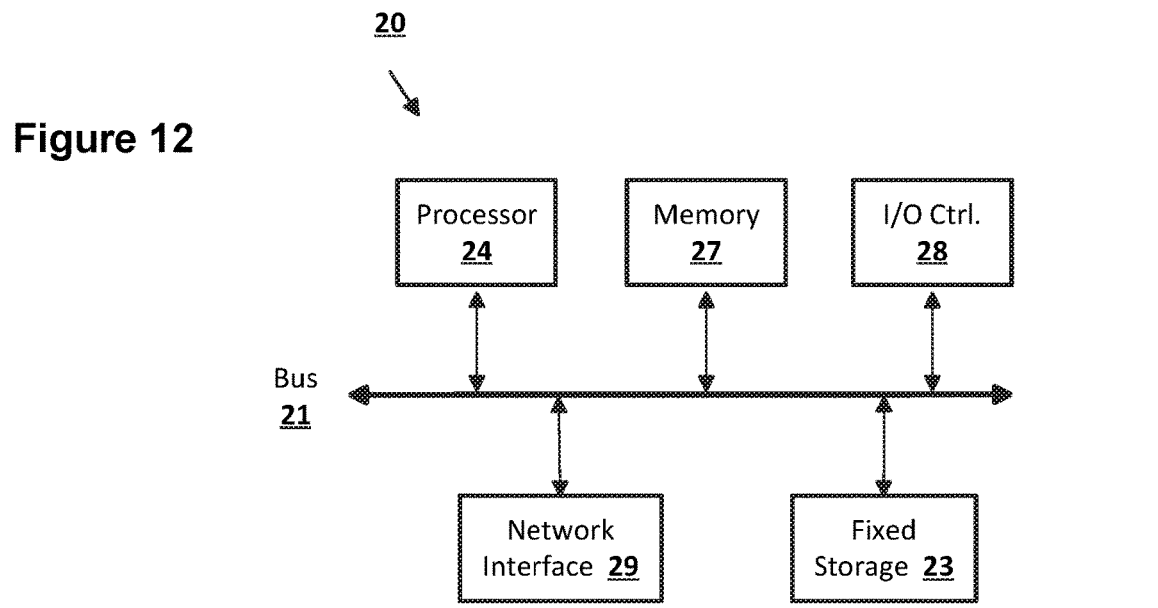
FIG. 12 shows a computer according to an embodiment of the disclosed subject matter.

Embodiments of the presently disclosed subject matter may be implemented in and used with a variety of component and network architectures. FIG. 12 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 13.

Many other devices or components (not shown) may be connected in a similar manner, such as document scanners, digital cameras, auxiliary, supplemental, or backup systems, or the like. Conversely, all of the components shown in FIG. 12 need not be present to practice the present disclosure. The components can be interconnected in different ways from that shown. The operation of a computer such as that shown in FIG. 12 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 13:
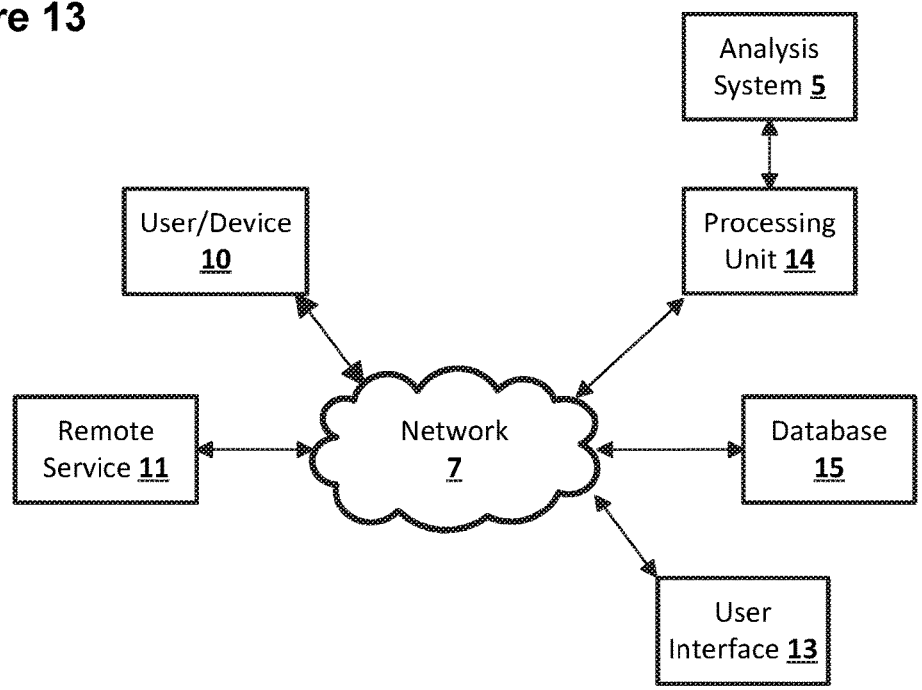
FIG. 13 shows a network configuration according to an embodiment of the disclosed subject matter.

FIG. 13 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A power receiver circuit device comprising:
   a power generating mechanism comprising power generating elements configured to generate alternating current signals;
   one or more rectifier circuits, each rectifier circuit comprising a rectifier configured to generate a direct current signal from an alternating current signal and a diode;
   one or more group circuits, each group circuit connecting a group of rectifier circuits in an electrical circuit to combine the direct current signals from the rectifier circuits in the group into a single direct current signal;
   a step down converter connected to the one or more group circuits, the step down converter configured to convert a direct current signal to a direct current signal of a target voltage level;
   an output switch connected to the step down converter;
   a linear regulator connected to the step down converter; and
   a microcontroller connected to the linear regulator and the output switch and configured to control the output switch, wherein the microcontroller is configured to open the output switch, enter a standby state, and send a message using a radio of the microcontroller that the voltage of the voltage of the direct current signal from the step down converter has dropped when the microcontroller determines that the voltage of the direct current signal from the step down converter falls below a predetermined a threshold voltage.

2. The device of claim 1, wherein the linear regulator is configured to convert a direct current signal from the step down converter to a direct current signal with a native voltage of the microcontroller.

3. The device of claim 1, wherein the microcontroller is configured to control the output switch by opening the output switch and closing the output switch.

4. The device of claim 1, wherein the microcontroller is configured to communicate with the transmitting device using the radio when the linear regulator supplies sufficient power to operate the microcontroller.

5. The device of claim 4, wherein the communication with the transmitting device comprises one or more of sending a measurement of a voltage of a direct current signal input into the step down converter, sending a measurement of a voltage of a direct current signal input to the output switch, sending a measurement of an amperage of a direct current signal output by the output switch, sending a message indicating that voltage of the direct current input to the output switch has fallen below a predetermined threshold, receiving a message instructing the microcontroller to open the output switch, and receiving a message instructing the microcontroller to close the output switch.

6. The device of claim 1, wherein the output switch is configured to output a direct current signal received form the step down converter when the output switch is closed and to output no signal when the output switch is open.

7. The device of claim 1, wherein the step down converter is further configured to receive the direct current signal from the one or more group circuits.

8. The device of claim 7, wherein the direct current signal from the one or group circuits has a varying voltage.

9. The device of claim 1, wherein each of the one or more rectifier circuits is connected to a single power generating element.

10. The device of claim 1, wherein the diode of one of the rectifier circuits is connected to an output of the rectifier of the one of the rectifier circuits.

11. The device of claim 1, wherein each group circuit connecting a group of rectifier circuits in an electrical circuit to combine the direct current signals from the rectifier circuits in the group into a single direct current signal connects the group of rectifier circuits in either parallel or in series.

* * * * *